UNITED STATES PATENT OFFICE.

JAMES H. THORP, OF NEW YORK, N. Y.

PHOSPHORESCENT PAINT.

SPECIFICATION forming part of Letters Patent No. 362,860, dated May 10, 1887.

Application filed October 13, 1886. Serial No. 216,135. (Specimens.)

*To all whom it may concern:*

Be it known that I, JAMES H. THORP, of the city, county, and State of New York, have invented certain new and useful Improvements in the Manufacture of Phosphorescent Substances; and I hereby declare the following to be a full, clear, and exact description thereof.

A variety of bodies and compositions of matter, especially such as have for constituents sulphur in combination with earthy salts, possess, as is a well-known scientific fact, the property of emitting rays of light in the dark after having been previously exposed to sun or day light. Taking advantage of this peculiar characteristic, phosphorescent compositions and powders of various descriptions have been prepared and employed to a considerable extent for producing luminous surfaces for a great variety of purposes, the most common method of utilizing these compositions being to apply them either in a powdered condition by dusting them over articles or surfaces previously coated with an adhesive substance, or by mixing them with paint or varnish and applying with a brush.

My invention relates to a novel method of utilizing luminous powder prepared mainly as a sulphide of calcium in such manner as to produce a more perfect and lasting luminous surface than heretofore, which will be better enabled to resist the action of the weather or time than the ordinary luminous paint or powder, which, when exposed on walls or otherwise employed out of doors, becomes impaired or is destroyed either by the weather, dirt, dust, or insects, or by some infectious matter.

To this end my invention consists in the admixture with cements, plaster, concrete, &c., of a luminous composition prepared as hereinafter specified, whereby a material or substance is obtained having a self-contained phosphorescent property within and throughout the entire thickness of its mass or body instead of a mere surface-coating, as when applied in the form of powder or paint, my improved luminous substance being adapted for molding into blocks or articles of any desired shape, or to be placed in a plastic state on walls, ceilings, or other surfaces with a trowel, the same as mortar.

In carrying my invention into effect I first take one pound of sulphur, one pound of borax, one pound of alum, one pound of rock-salt, twenty-five pounds of pulverized marble, and three pounds of a substance prepared mainly as a sulphide of calcium and commercially known and sold at wholesale drug-stores under the name of "phosphorescent powder." I grind these ingredients together until they are reduced to a fine powder, and then sift and bolt the same until they become thoroughly and intimately commingled together in a dry finely-pulverized condition. This I term my improved "luminous" composition or powder. I then dissolve in a separate vessel five pounds of lime in forty gallons of water, adding thereto, when the lime is dissolved, one quart of silicate of soda, the whole being then stirred together and forming my dampening solution, to be hereinafter referred to.

I next take fifteen pounds of either marble or quartz, preferably ground to the size of pinheads, or fine sand of the same size, or pulverized sea-shells, and add thereto four pounds of my above-described luminous composition or powder and eight pounds of finely-ground gypsum or Keene's cement. These ingredients are then thoroughly and intimately mixed together in a suitable box or receptacle, and are then dampened with my above-described chemical solution until the mass is brought to such a consistence that it will not adhere to the mold. I then take a mold of the desired shape and apply to its bottom and sides the above-described dampened compound, preferably to the thickness of from one-eighth to one-quarter of an inch, to form the outside of the work, leaving the interior of the mold hollow, which is then filled with cement, concrete, or other suitable coarse material, which, after being thoroughly tamped, is made level with the top by a trowel. The mold is then turned over on a board and immediately removed from the molded stone block, or other article, which is then left to dry, the dampening solution producing a strong adhesion of the particles and causing the substance to become hardened and crystallized and impervious to air and water, thereby enabling it to successfully resist the action of fire, frost, and other disintegrating influences.

If it should be desired to cast small articles or figures, or to use the substance as a coating for walls or ceilings, I mix the materials in the same proportions and dampen or wet them with the same solution, but use a sufficient quantity of the latter to bring the mass to such a consistence that it can be poured into the mold or placed upon the wall or ceiling with a trowel, in the same manner as mortar. When the stone block, or other article, or the wall, or ceiling, is perfectly dry, if it should be desired to augment the luminosity, and thereby render the surface more brilliant, I take my luminous compound in a dry state and grind it with oil or varnish and apply the same evenly to the said article, wall, or other surface, and then, while the surface is still wet, with a bellows or dredging-box, dust on a very small quantity of my above-described luminous composition, care being taken to apply the same as evenly and uniformly as possible. This application of the compound, ground in oil or varnish, to the surface of the article, has the further advantage of filling up the pores and giving the surface a more finished appearance, while the compound, by reason of the oil or varnish, is impervious to water, and forms a sizing that will effectually protect the luminous surface from the effects of exposure to the weather, forming a substitute for paint, which may be reduced with shellac, dissolved in turpentine or alcohol, to render it as thin as required.

The above-described luminous powder and compounds should be prepared in a dark room, or in one illuminated by means of artificial light, in order to produce the best results.

Building-blocks and other articles made as above described are impervious to air, water, or moisture, as the substance will become thoroughly hardened and crystallized by the dampening solution above described, and a strong and perfect adhesion of the particles is produced, whereby it is enabled to successfully resist the action of dampness, frost, or heat, and is thus perfectly adapted for use under all conditions and in any climate; and it will be obvious that by thus employing a thick layer or body of the material, having a self-contained phosphorescent property throughout its entire thickness, there will be no liability of its scaling or peeling off, as it is embodied in the stone or wall itself to a considerable depth, and consequently cannot fade or wear off like paint.

My improved luminous cement or compound may be applied to wood, iron, or other materials, whereby surfaces or objects can be rendered permanently phosphorescent, as above described, and may be advantageously employed for manifold purposes—for instance, for the garden, luminous concrete, as edging to garden-paths and carriage-drives; for guides and beacons at the entrance gates of drives; insides of stables, the base of balustrades or the entirety of balustrades; for docks, for edging of piers and wharves; for water-works, for the safety and dispatch of night work by the erection of luminous guides and beacons; for clock-cases, door-plates, key-hole plates, and door-knobs, and for fire-plug notices on walls; for roads, as luminous beacons at corners of dark country lanes, and at the ends of bridges, ends of walls, and curbs of foot-paths—in short, for any places where the light of day will sufficiently excite the phosphorescent property to render the cement or concrete work or substance luminous by night.

What I claim as my invention, and desire to secure by Letters Patent, is—

1. The herein-described luminous compound or substance, composed of ground marble and pulverized gypsum or Keene's cement as a base, combined with the herein-described dry luminous composition, formed of sulphur, borax, alum, rock-salt, pulverized marble, and phosphorescent powder, mixed together substantially in the proportions named, and united and solidified by dampening or wetting the same with a chemical solution formed of water, lime, and silicate of soda, substantially as and for the purpose set forth.

2. The herein-described luminous compound or substance, composed of ground marble and pulverized gypsum or Keene's cement as a base, combined with the herein-described dry luminous composition, formed of sulphur, borax, alum, rock-salt, pulverized marble, and phosphorescent powder substantially in the proportions named, and mixed with a suitable vehicle, substantially as and for the purpose set forth.

Witness my hand this 2d day of October, A. D. 1886.

JAMES H. THORP.

In presence of—
WILLIAM P. DUFFY,
MATTHEW DUFFY.